May 27, 1952 — J. D. LANGDON — 2,598,002
CHECK VALVE CONSTRUCTION
Filed Aug. 20, 1946
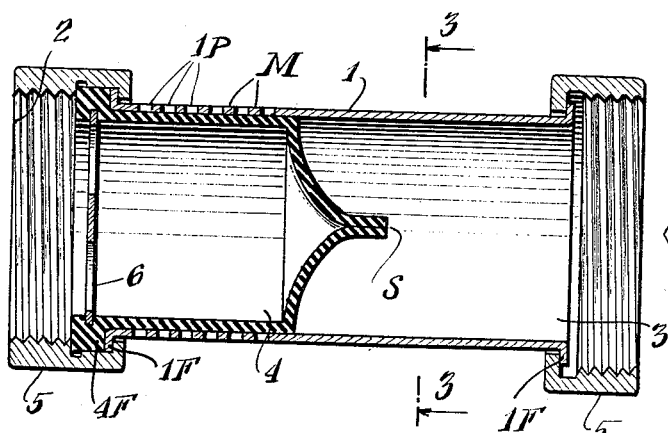
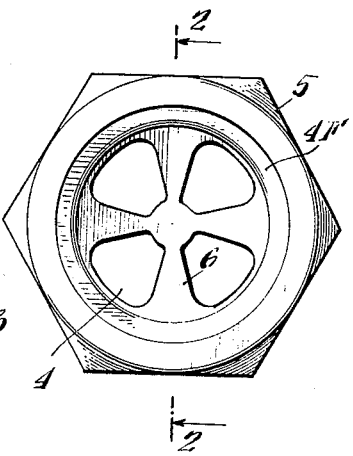
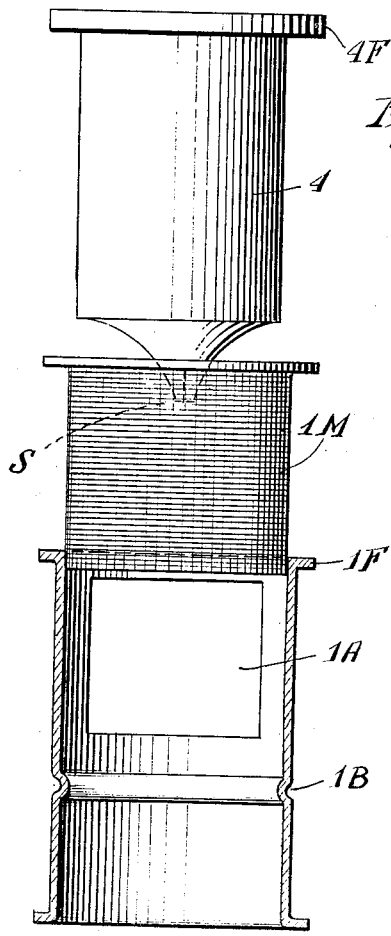
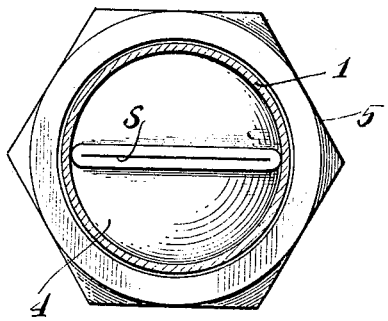
INVENTOR
J. D. Langdon Patented May 27, 1952

2,598,002

UNITED STATES PATENT OFFICE 2,598,002

CHECK VALVE CONSTRUCTION

Jesse D. Langdon, Long Beach, Calif.

Application August 20, 1946, Serial No. 691,761

5 Claims. (Cl. 251—122)

This application is a continuation in part of pending applications in the U. S. Patent Office: Ser. Nos. 468,754, December 12, 1942, now Patent Nos. 2,371,449, 522,959, February 18, 1944, 560,841, October 28, 1944.

The present invention relates to flexible valve members disposed in a casing and adapted to be expanded against the internal surface of said casing designed to withstand internal fluid pressure, said flexible valve member extended across and normally closing vents thru the wall of said casing.

The primary object of this invention is to provide a flexible check valve member circumscribing the inner surface of a housing or casing, the flexible valve member constituting valve means forming a portion of the inner wall of a conduit for pressure fluid.

Another object is to provide a casing for a device of the nature described having suitable vents thru the wall thereof provided by a sieve-like portion forming a section of the casings IP and M; adapted to prevent the wall material of a flexible valve member inserted into said casing from being forced thru said vents by internal fluid pressure.

A further object is to permit the ingress of atmospheric pressure thru the perforated wall of a casing when a sub-atmospheric pressure occurs within said casing, by the provision of a valve member having a flexible wall of suitable thickness and made of material having a suitable density and being capable of being deformed and being returned to normal shape after being deformed.

A still further object is to construct a device of the nature described by the combination of parts separately old whereby new results are obtained.

Another object is to aid those desiring to invent devise, construct or manufacture a device of the nature described, therefore reference is made to the following patents issued to Jesse D. Langdon, the present applicant: 2,074,698, March 3, 1937, for Flush Valve Unit, reissued as Re. 21,323, January 16, 1940; 2,211,212, for Siphon Breaker and Valve; 2,270,838, January 20, 1942, for Integral Valve and Vacuum Breaker; 2,370,737, January 20, 1942, for Siphon Breaker and Valve; 2,238,382, August 31, 1943, for Flexible Check Valve and Vacuum Breaker; 2,371,449, March 13, 1945, for Valves, all of the above patents being herein referred to as subject to the improvements constituting the subject matter of this application.

Other and further objects and purposes will appear during the the progress of the following specification, as illustrated by the drawings which show two forms of reduction to practice, which are shown for the purpose of illustration only, the invention being limited to the scope of the claims.

Of the drawings:

Fig. 1 is a plan view from the inlet end.

Fig. 2 is a sectional view intersected at 2—2, Fig. 1.

Fig. 3 is a transverse sectional view as at 3—3, Fig. 2, viewed from the outlet end.

Fig. 4 is an exploded view including a casing in median section, and the other parts in elevation.

Fig. 4 shows an alternative structural organization, being the full equivalent of the structure shown by Fig. 2 with the nuts 5—5 removed; a flanged mesh sleeve M being substituted for the perforated portion of casing I, Fig. 2.

The forms of reduction to practice used to describe the invention consist of an organization comprising a casing I having a shoulder flanged outwardly of each end thereof IF—IF and having an inlet 2, an outlet 3, a flexible sleeve-like valve member 4 made of material capable of being deformed and returning to normal shape after being deformed, inserted into the inlet end 2 of casing I. Attaching means comprising coupling nuts 5—5 are held in assembled relationship with casing I by flanges IF—IF in conjunction with internally projecting shoulders of the nuts 5—5, thus forming a unit capable of being coupled between the two ends of a pressure fluid conducting pipe threaded to fit the coupling nuts 5—5, and thereby providing coupling means to introduce the unit into a pipe line. Any other coupling means suitable to the contingencies of use may be used.

The casing I, as of Fig. 1, is perforated circumferentially near the inlet end 2 by a series of relatively small perforations IP forming a sieve-like portion, the material between the perforations forming the network of a meshed wall; confined to an area of the casing I intervening between the two ends of the sleeved portion of the flexible valve member 4. The sleeve valve member 4 illustrated as made of rubber by Fig. 1 of the instant reduction to practice is closed at the outlet end by a diaphragm-like portion having a transversely lipped slit portion projecting toward the outlet of the casing I, the lipped portion bordering a slit S, the walls of the slit normally touching one another.

The slit S is opened by the force of internal pressure fluid passing from the inlet 2 to the outlet 3 thru the sleeve 4 and casing 1 or 1A.

When the device is not in operation or is under internal pressure, the member 4 preferably normally rests against the internal wall of the casing 1, closing the perforations 1P as of Fig. 1 or the mesh 1M as of Fig. 4 as the case may be.

It will be noted that perforations 1P of Fig. 2 and 1M of Fig. 4 are smaller in diameter than the wall thickness of member 4 prohibiting the wall from being forced thru the relatively fine meshed portion of the casing formed by the sieve-like or screen portion 1P—1M of the casing wall 1.

The assembly illustrated by Fig. 4 comprises a flexible valve member 4 centralized with a meshed sleeve 1M which is in turn inserted into a casing having apertures 1A thru the wall thereof and forming a cage to retain the described elements. The casing is provided with an internally extended bead 1B of sufficient extent to provide a rest for the meshed sleeve 1M or at least provide a projection against which the outer circumference of the valve member 4 may rest. When the coupling nut 5 is used and coupled to the end of a pipe, the shoulder of the valve member 4 is compressed between the end of the pipe and the flanged end of the meshed sleeve 1M and the flange 1F of casing 1, the flanged shoulder of member 4 acting as a gasket to prevent the leakage of fluid pressure. The lower end of the sleeve portion of valve member 4 acts to seal off fluid pressure around the distal end of mesh 1M. Thus it will be seen that any apertures thru the casing 1 as of Fig. 4 are sealed against the leakage of fluid pressure from within.

When pressure fluid is flowing thru the device, the slit S is urged open according to the volume of pressure fluid passing therethrough and the perforations 1P or the mesh 1M are closed by internal pressure against the wall of member 4 greater than atmospheric pressure. On the other hand, when a sub-atmospheric pressure is induced from the inlet end 2, atmospheric pressure urges the wall of the member 4 away from the perforations 1P or mesh 1M, permitting atmospheric pressure to enter the casing 1 and collapse the valve member 4 urging the slit S tightly shut by external pressure against the extended lip portion. The spider 6 disposed transversely of and having a rim inserted into an internal groove in the shoulder of the valve member 4 provides guard means which prevents said valve member 4 from being reversed and opened toward the inlet 2.

The flexible valve member 4 should preferably be made of deformable material which cannot vulcanize or stick to the adjoining inner surfaces of the casing 1. Water repellent fabric can be used, but a rubber-like material is preferred however to construct the valve member 4. Up to 2% of parafine or graphite or the same percentage of the two combined in compounding a gum rubber formula will serve to prevent vulcanization to metal after having been cured.

The use of metal having a high nickel content to make the perforated portion or mesh portion of the casing 1 will be less liable to stick to various ordinary rubber compounds if used to make the member 4.

The described check valve construction is designed to eliminate a cross connection and check backflow from the outlet to the inlet ends of a fluid pressure supply line.

Having described the invention and the operation thereof, the following claims are made:

1. A check valve construction comprising a casing having an inlet and outlet and apertures thru the wall thereof communicating with the atmosphere, a flanged meshed screen sleeve inserted into the inlet end of said casing, the wall thereof registering with said apertures, a flanged sleeve-like flexible valve member inserted into and registering with the meshed sleeve, the sleeved portion of the flexible member extending beyond the meshed sleeve, means to attach the two ends of the casing intermediate of a fluid pressure conduit whereby internal fluid pressure will urge the flexible member against said meshed sleeve and the internal surface of said casing to seal the same against leakage, the flexible sleeve member having a tubular wall with an imperforate portion thereof concomitant with the mesh sleeve, said flexible sleeve member converging toward said outlet, the wall thereof forming lip means bordering normally closed slit means adapted to open under the effects of internal pressure and to close when a subatmospheric pressure prevails within the flexible sleeve, the material of said flexible sleeve being of a deformable nature and constructed to function as a check valve to prevent the ingress of pressure fluid into the flexible sleeve and at the same time admit air into the casing when vacuum conditions prevail within said flexible sleeve member, the passages of said mesh sleeve communicating with atmosphere and the inside of the casing.

2. A device as of claim 1 wherein that portion of the casing adjacent the terminus of the meshed sleeve projects radially inwardly to provide a seat for that portion of the flexible valve member overlapping the terminus of the meshed sleeve and the adjacent portion of the casing.

3. A device of the nature described comprising a tubular casing having inlet and outlet ends, the casing provided with a sieve-like section forming a meshed wall portion between the two ends, the openings of the mesh providing vent means communicating with atmosphere, the material between the openings thru the mesh forming a network, a sleeve valve inserted into said casing and surrounded by said network and being made of deformable material dense enough to resist being urged thru the mesh openings by internal pressure, at least that end of said valve member that is toward the inlet being juxtaposed with said casing to form pressure sealing coupling means for attaching the same to a source of fluid pressure supply, whereby internal pressure will expand the sleeve valve against the meshed wall portion formed by the network protecting and supporting the wall of said sleeve valve from being forced thru the vents, said sleeve valve having an imperforate sleeve portion extended toward said outlet and beyond the sieve-like portion of said casing, a normally closed check valve provided at that end of said sleeve valve that is toward said outlet, guard means standing transversely internally of said sleeve valve whereby the valve is prevented from being reversed by external pressure and urged thru the inlet end of said casing, said imperforate sleeve portion concomitant with and seating against an imperforate wall portion of said casing provided between said vent means and said outlet when said sleeve valve is expanded by internal pressure.

4. A device as defined by claim 3 wherein the imperforate wall portion of said casing between the sieve-like portion and the outlet is provided with an internal bead circumscribing the casing concomitant with an imperforate portion of, and providing a seat for the sleeve valve under the influence of internal pressure.

5. A valve construction combining a tubular casing having an inlet and outlet and a relatively fine meshed sieve-like wall portion intermediate of said inlet and outlet and forming vent means communicating between the inside and outside of the casing, a sleeve member with an imperforate wall made of deformable material inserted in said casing and overlying the meshed portion, said sleeve member having one end secured to the inlet end of said casing and associated with pressure sealing means adapted to hold said casing and said sleeve in pressure sealed operative position with a source of pressure fluid supply, the outlet end of said sleeve being closed and slit to permit the passage of pressure fluid, said sieve-like portion of said casing forming the wall surrounding and supporting the imperforate portion of the sleeve above the closed end against being forced thru said vent means under the effects of internal pressure, said deformable sleeve member capable of collapsing to close the slit end under the effects of external pressure when a lesser state of pressure exists internally of said sleeve permitting an external pressure medium to enter said casing the openings of the sieve-like portion of the casing wall being smaller in diameter than the wall thickness of the deformable sleeve member.

JESSE D. LANGDON.

REFERENCES CITED

The following references are of record in the file of this patent:

UNITED STATES PATENTS

| Number | Name | Date |
|---|---|---|
| 2,033,955 | Robinovitz | Mar. 17, 1936 |
| 2,270,737 | Langdon | Jan. 20, 1942 |
| 2,322,631 | Groeniger | June 22, 1943 |
| 2,328,382 | Langdon | Aug. 31, 1943 |
| 2,347,988 | Burke | May 2, 1944 |